United States Patent [19]

Dyer

[11] Patent Number: 4,637,420

[45] Date of Patent: Jan. 20, 1987

[54] METERING VALVE

[75] Inventor: Gerald P. Dyer, Enfield, Conn.

[73] Assignee: United Technologies Corporation, Hartford, Conn.

[21] Appl. No.: 809,367

[22] Filed: Dec. 16, 1985

[51] Int. Cl.⁴ .......................... B08B 1/04; F16K 5/12; F16K 51/00

[52] U.S. Cl. .................................. 137/242; 251/208; 251/288

[58] Field of Search ............ 137/238, 242, 243, 243.2; 251/205, 208, 288; 60/39, 281

[56] References Cited

U.S. PATENT DOCUMENTS

| | | | |
|---|---|---|---|
| 2,638,330 | 5/1953 | Morgenroth | 251/208 |
| 2,989,082 | 6/1961 | Ray | 137/238 |
| 3,047,006 | 7/1962 | Transeau | 137/243 |
| 3,059,893 | 10/1962 | Pursel | 137/243.2 |
| 3,899,879 | 8/1975 | Downing | 251/208 |
| 4,439,376 | 3/1984 | Härtel et al. | 251/208 |

Primary Examiner—George L. Walton
Attorney, Agent, or Firm—John Swiatocha

[57] ABSTRACT

A rotary metering valve (10) includes a pair of windows (145, 200) in mutual registry with one another, the windows defining a flow passage through the valve. The geometries of windows are such that closing the valve sweeps contaminants trapped therein, inwardly, thereby enhancing the effectiveness of the output torque of the valve's actuator (75) in breaking apart the contaminants for subsequent removal by flow through the valve.

15 Claims, 5 Drawing Figures

METERING VALVE

DESCRIPTION

1. Technical Field

This invention relates generally to valves and specifically to fuel metering valves for gas turbine engines.

2. Background Art

Gas turbine engines such as those used in powering aircraft, typically employ metering valves to meter precise flows of fuel to the engine to achieve desired performance thereof. Such metering valves have in the past been servo controlled. That is, such valves have been adjustable by servo fluid pressure thereon. In most cases, the servo fluid comprises the engine fuel itself. Accordingly, it will be appreciated that an associated fuel pump must have a capacity sufficient not only to provide sufficient fuel to the engine burners, but also to pressurize the fuel sufficiently for the servo control of the metering valve. Such pump capacity can result in gas turbine engine fuel pumps which are unacceptably large and which generate unacceptable amounts of heat.

In an effort to reduce pump size and heat output thereof, electromechanical motors rather than hydraulic servo controllers have been proposed for controlling fuel metering valve settings. While such motors are potentially lighter in weight and more thermally efficient than their hydraulic counterparts, the utility of such motors may be limited by the output capacity thereof. As those skilled in the art will appreciate, a gas turbine engine fuel metering valve must be able to break apart solid fuel contaminants trapped therein as the valve closes, to minimize the risk of engine fuel starvation due to obstruction of fuel handling passages within the valve, by foreign matter. Accordingly, to minimize the required size and thermal inefficiencies of electromechanical metering valve controllers, a fuel metering valve having an enhanced capacity for breaking foreign matter trapped therein, is highly desirable.

DESCLOSURE OF INVENTION

Therefore, it is among the objects of the present invention to provide an improved electromechanically controlled metering valve having an enhanced ability to break apart solid contaminants trapped therein.

In accordance with the present invention, contaminants trapped within a rotary fuel metering valve are swept radially inwardly by the closing of the valve, whereby the output torque of a rotary, electromechanical valve actuator may be most effectively used to break apart the contaminants and allow fuel flow throuoh the valve to remove the contaminants therefrom.

In accordance with another aspect of the present invention, the valve hereof comprises a stationary valve body and a rotatable metering element mounted thereon and operated by an electromechanical actuator, and includes mechanical stops which limit the movement of the metering valve element with respect to the valve body, such stops being disposed proximally to one another for ease in the accessibility thereof for purposes of the adjustment thereof, when the metering valve is installed in a gas turbine engine fuel control.

In accordance with another aspect of the present invention, the valve body is provided with a window accommodating fuel flow therethrough, such window being located proximally to the center of rotation of the metering element for purposes of minimizing the torque output of the actuator required to overcome forces on the valve due to a pressure drop thereacross.

In accordance with yet another aspect of the present invention, the valve body and metering element engage one another at grooved contiguous surfaces thereof, servo fuel received within the grooves tending to equalize fuel pressures across the valve to reduce frictional resistance to valve movement due to the pressure drop thereacross.

BEST MODE FOR CARRYING OUT THE INVENTION AND INDUSTRIAL APPLICABILITY THEREOF

Figure 1:
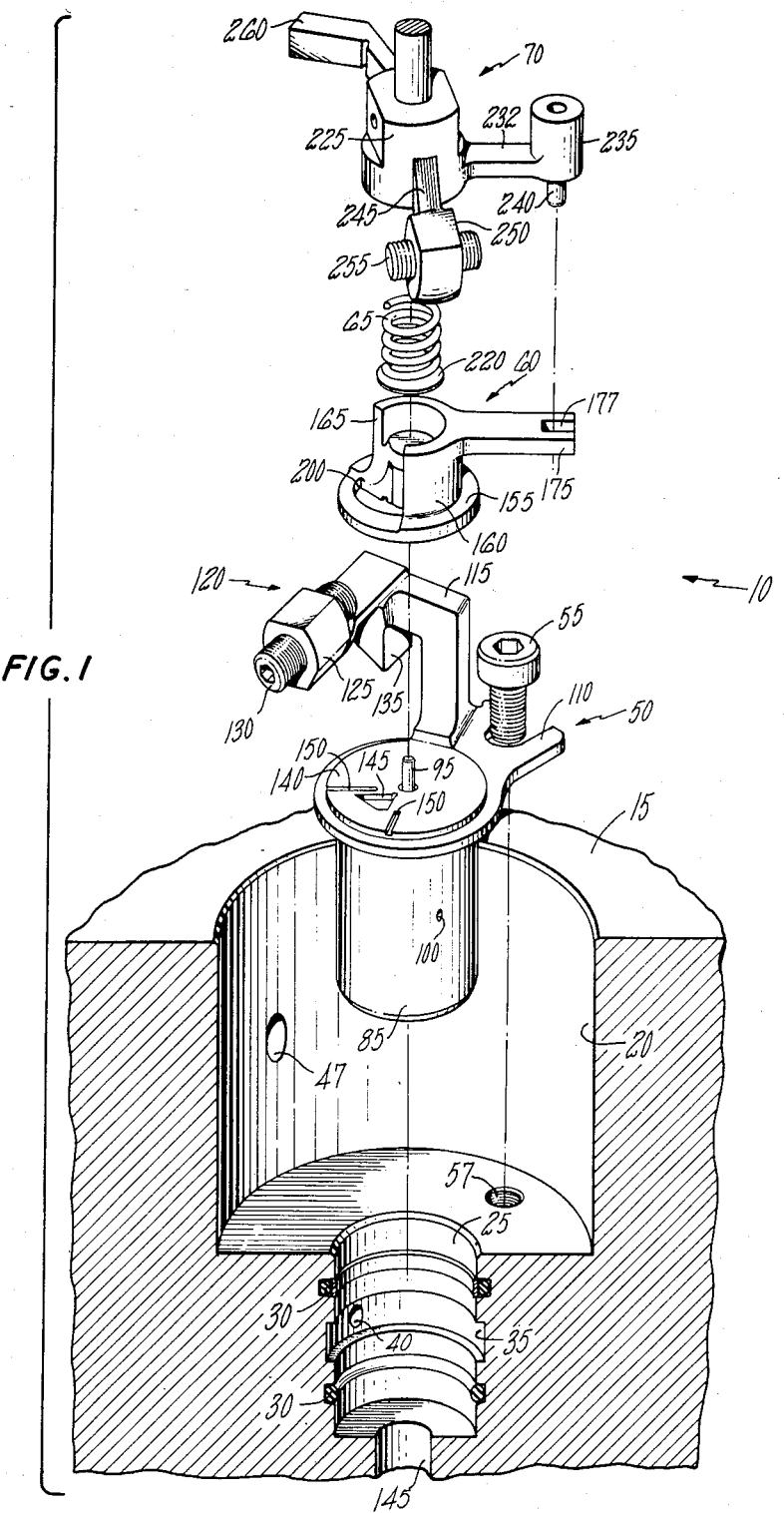
FIG. 1 is an exploded isometric view of the metering valve of the present invention.
Figure 2:
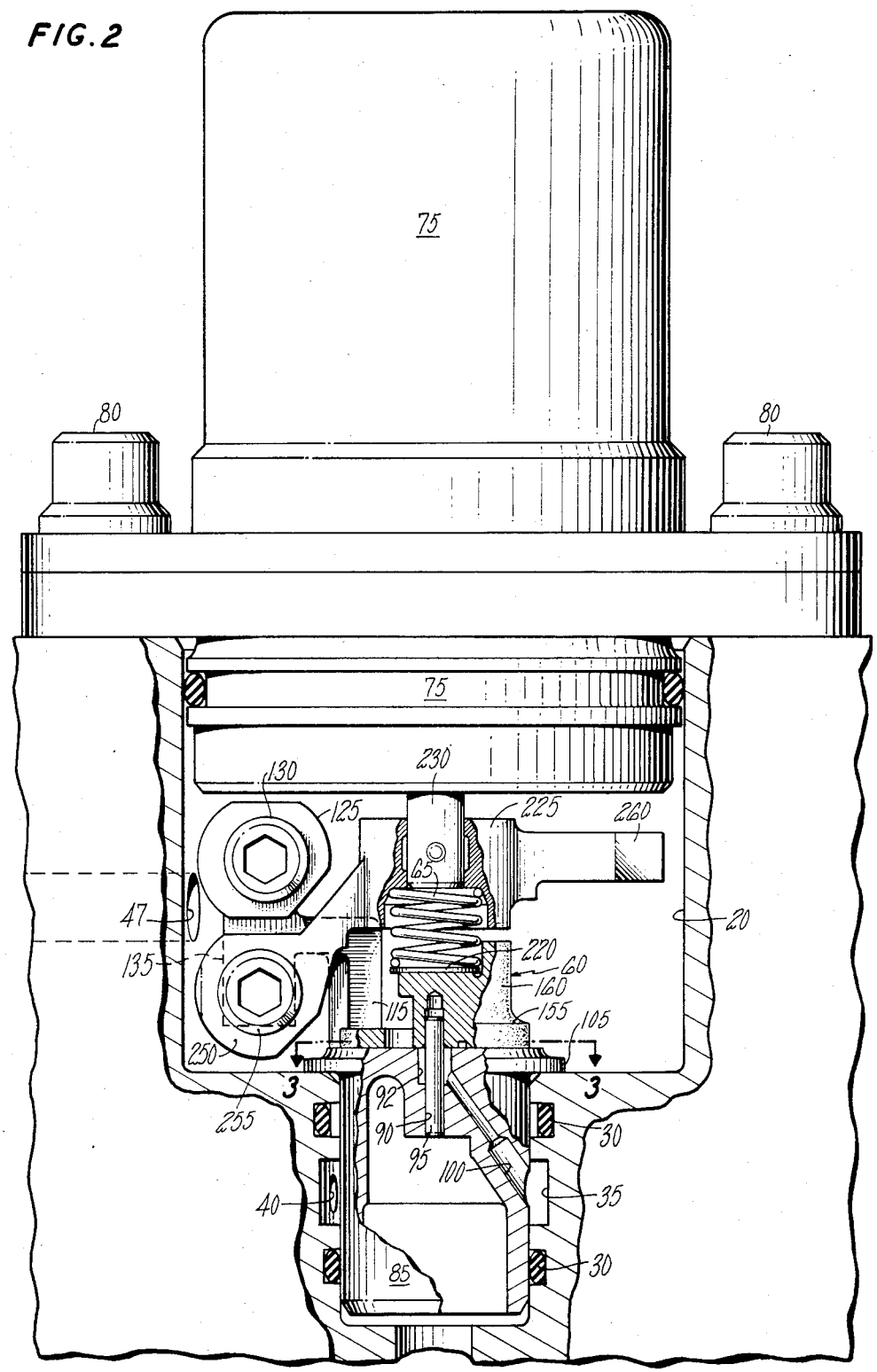
FIG. 2 is a partially sectioned elevation of the metering valve of the present invention.

Referring to the drawings and particularly to FIGS. 1 and 2 thereof, the metering valve of the present invention, shown generally at 10, is disposed within a housing 15 such as that which would be provided in any of various gas turbine engine fuel controls such as those manufactured and sold by the Hamilton Standard Division of United Technologies Corporation. Housing 15 is provided with a chamber 20 therein having an axial bore 25 at the bottom thereof, bore 25 being grooved to receive O-ring seals 30 and to provide at 35, an annular chamber through which fuel draining through valve 10 is conducted to radial drain passage 40. An axial discharge passage 45 is disposed in the bottom of bore 25 to channel fuel metered by valve 10 therefrom. Fuel is received within chamber 20 through port 47 provided therein.

The metering valve itself comprises a generally cylindrical valve body 50, received within bore 25 and fixed to the housing by means of cap screw 55 threaded into hole 57; and a metering element 60 rotatably mounted on body 50. As will be explained in further detail hereinafter, each of metering element 60 and body 50 include a window therein, the windows defining collectively, a fluid passage through the valve, the mutual registry of the windows being controlled by adjustment of the relative rotary position of the metering element with respect to the valve body for controlling flow through the valve.

A spring 65 is received within metering element 60, applying pressure thereginst for purposes of enhancing the seating of the metering element on the valve body to minimize leakage therebetween. A rotatable drive member 70 is rotated by electro-mechanical actuator (motor) 75 which is bolted on housing 15 with bolts 80 (FIG. 2), and provides a mechanical connection between the motor and metering element 60, whereby selective energization of the motor effects the adjustment in the position of the metering element.

As best seen in FIG. 2, valve body 50 comprises a hollow cylindrical base portion 85 bored and counterbored at 90 and 92 respectively, to receive an upright pin 95. Pin 95 is fixed to base portion 85 by an interference fit therewith, brazing or the like. Base portion 85 is obliquely drilled at 100, drill hole 100 providing communication between counterbore 92 and annular passage 35 whereby the leakage of fuel between the metering element and valve body is channeled through the counterbore, drill hole 100, annular passage 35 and radial hole 40, to any suitable fuel reservoir (not shown). The valve body is seated within bore 25, on the bottom of chamber 20 by means of flange 105 which extends radially outwardly from the upper end of body portion 85. Flange 105 includes a slotted lug 110 through which screw 55 is received for positively fastening the valve body to the bottom of chamber 20. A first stop arm 115 extending axially and radially outwardly from the valve body carries a first stop 120 comprising a threaded collar 125 and a screw 130 threaded into the collar for purposes of rendering the stop adjustable. As shown, arm 115 also carries a tang 135 extending axially inwardly from the upper portion of arm 115. In a manner to be described in further detail hereinafter, tang 135 functions as a detent for a second stop, the first and second stops serving to limit the rotation of valve element 60 with respect to valve body 50. Collar 125 and tang 135 may be integrally formed with arm 115 which, with flange 105 and lug 110, may be formed integrally with cylindrical portion 85 of the valve body by casting or the like.

Figure 4:
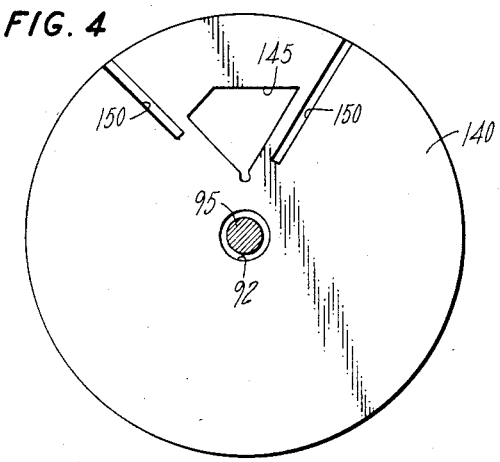
FIG. 4 is a plan view of the upper surface (as illustrated in FIG. 2) of the body of the metering valve.

Referring to FIG. 4, body 50 is provided with a smoothly, machined upper surface 140 having a four-sided window 145 at a radially inner portion thereof. Window 145 provides communication between valve element 60 and the hollow interior of the valve body. Surface 140 is also radially grooved at 150, the grooves being disposed on opposite sides of window 145 and extending between radially interior portions of surface 140 and the radially outer edge thereof.

Figure 5:
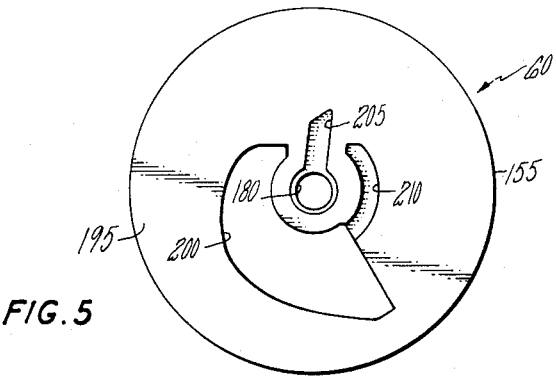
FIG. 5 is a plan view of the lower surface (as illustrated in FIG. 2) of the rotatable metering element of the metering valve.

Valve element 60 comprises a circular, radially outstanding base 155, an axially upstanding portion 160 provided with a recess 165 at the top thereof, and a radially outwardly extending, input arm 175 including a radial slot 177 therein. Arm 175, base 150 and upstanding portion 160 may be integrally formed by casting or the like. As best seen in FIG. 5, base 155 of the valve element is drilled at 180 to slidably receive pin 95 on which the valve element pivots as it is rotated with respect to body 50 to vary the flow area through the valve. The bottom of base 155 is machined to a smooth, flat surface 195 which is contiguous with the upper surface 140 of valve body 50. A window 200 having a generally truncated, crescent shape is provided through base 155 and at a radially interior portion of the window, through axially upstanding portion 160. Window 200, as window 145, is disposed at a radially inner location in the valve. Surface 195 is grooved radially outwardly from hole 180 at 205 and in a circumferential direction from the truncated end of window 200 at 210.

Coil spring 65 is seated on shim 220, being retained between metering element 60 and drive member 70, and applies a compressive sealing force between the metering element and the valve body to reduce leakage therebetween.

Drive member 70 includes a medial portion 225 axially drilled for attachment to the rotary output shaft 230 of electromagnetic actuator 75 as by a pinned connection therewith. Drive member 70 includes a radially outwardly extending drive arm 232 having a drive dog 235 disposed at the end thereof. Drive dog 235 includes a pin 240 which is received within radial slot 177 in input arm 175. Thus, it will be seen that rotation of output shaft 230 by energization of motor 75, rotates pin 240 and thereby effects rotation of valve element 60, any eccentricities between the drive member and valve element being accommodated by radial movement of pin 240 within slot 177. Such rotation adjusts the mutual registry of windows 145 and 200 to vary the effective flow area of the valve.

A second stop comprising a radially outwardly and axially downwardly extending arm 245 carrying a threaded collar 250 at the end thereof in which a screw 255 is received, is also provided on drive member 70. A first stop detent 260 also extends radially outwardly from medial portion 225. As best seen in FIG. 2, screw 255 is axially and radially aligned with detent 135. Likewise, detent 260 is axially and radially aligned with screw 130 held by stop 120 on valve body 50. Accordingly, it is seen that full clockwise (as illustrated in FIG. 1) movement of drive member 70 and valve element 60 brings stop screw 255 into engagement with detent 135 to limit such movement to a select value thereof. Likewise, counterclockwise (as viewed in FIG. 1) movement of drive member 70 and valve element 60 brings detent 260 into engagement with stop screw 130 to limit such counterclockwise movement of the valve element. The magnitude of such movement is readily adjusted by the adjustment of the stop screws within the collar therefor.

Figure 3:
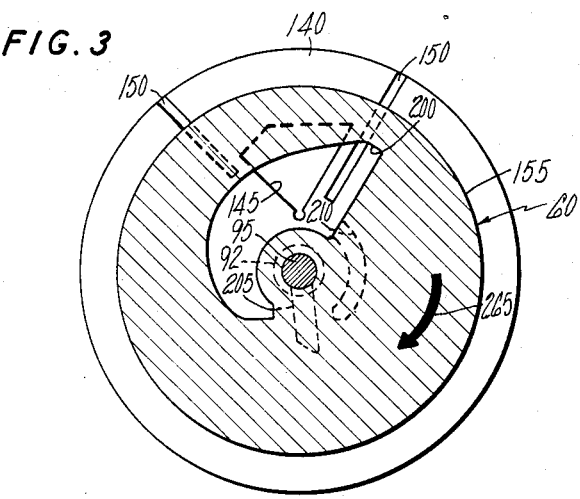
FIG. 3 is a plan view taken along line 3—3 of FIG. 2.

As set forth hereinabove, in the normal operation of gas turbine engines such as those which power aircraft, missiles and the like, it is a common practice to provide the metering valve in the engine's fuel control with the capability of breaking apart contaminants which lodge within the fluid handling passage of the metering valve. In accordance with the present invention and as best seen in FIG. 3, the outer edge portion of the metering element window is provided with a continuously decreasing radius with respect to the axis of rotation of the valve for progressively closing the flow passage through the valve defined by the two windows, in a radially inward direction as the metering element is rotated in the direction of arrow 265. This urges contaminants trapped between the two windows to be urged radially inwardly with respect to the valve, thereby allowing the available output torque of the electromechanical actuator 75 to be used most effectively in breaking apart such contaminants by the shearing thereof between the edges of the metering element and valve body windows.

Those skilled in the art will also recognize that various other aspects of the metering valve of the present invention further distinguish this valve from prior art valves. The radially outwardly extending input arm of the metering element maximizes the torque available from the electromagnetic actuator for contaminant breakage. The radial slot provided in the input arm readily accommodates radial eccentricities between the drive member, actuator and metering element. The relative axial and radial proximity of the stops with respect to one another allows ready adjustment thereof from a single access opening from the fuel control within which the metering valve is employed. The cantilevered structure of arm 115 renders to the valve, a capacity for the absorption of impact energy as the detents and stops engage one another. The radially inner disposition of the windows in the metering and body element minimizes the opposition to valve adjustment due to fluid forces on the valve resulting from the pressure drop across the windows. Likewise, the grooves provided in the body and metering valve element contiguous surfaces, accommodate fuel at supply pressure to enhance pressure equalization between the exterior of the metering valve and the interior thereof, thereby minimizing the actuation torque required to overcome the resistance offered by axial fluid pressure forces.

While the metering valve of the present invention has been described within the context of a gas turbine engine fuel control, it will be understood that this valve is suitable for various other applications as well. Moreover, while specific window shapes have been illustrated, it will be understood that the exact window shape will be dictated by the fluid flow characteristics required of the valve. Therefore, it will be understood that windows of various other shapes are determined by the flow characteristics of the valve based on various settings thereof may be employed without departing from the present invention. Similarly, various other modifications may be made in the structure of the valve disclosed herein without departing from the present invention and it is intended by the following claims to cover any such modifications as may fall within the true spirit and scope of this invention.

Having thus described the invention, what is claimed is:

1. In a valve comprising a valve body and metering element disposed thereon and rotatable with respect thereto about an axis of rotation, said valve body and metering elements being provided with windows therein, each of said windows including edge portions said windows collectively defining at least in part, a fluid flow passage through said valve, and being selectively registrable by adjustment of the relative rotary position of said metering element with respect to said valve body, the improvement characterized by:

one of said windows including a curved outer edge portion of continuously varying radius with respect to said axis of rotation for progressively closing said flow passage in a radially inward direction by rotation of said metering element, whereby solid contaminants lodged between said windows in said passage are urged radially inwardly by said rotation of said metering element to enhance breakage thereof by shearing between the edge portions of said metering element and valve body windows.

2. The metering valve of claim 1 characterized by said curved outer edge portion of progressively varying radius being provided in said metering element window.

3. The metering valve of claim 1 characterized by a rotatable output member adapted for rotation by a motor, said metering valve including a drive member fixed to said output member and rotatable therewith, said metering element including a radially outwardly extending input arm driven by said drive member for enhancing the torque applied to said contaminants for said breakage thereof by said motor.

4. The metering valve element of claim 3 characterized by a spring retained between said drive member and said metering element, said spring applying a compressive sealing force between said metering element and valve body.

5. The metering valve of claim 1 characterized by said input arm including a generally radial slot therein, said drive member comprising a radially outwardly extending drive arm having a drive dog at the end thereof, said drive dog being receivable within said slot and movable with respect thereto for accommodating radial eccentricities between said drive member, motor and said metering element.

6. The metering valve of claim 3 characterized by a first stop fixed to said valve body and engageable by a first stop detent extending generally radially outwardly from said drive member for limiting the rotation thereof and of said metering element in a first circumferential direction.

7. The metering valve of claim 6 characterized by said first stop being fixed to a first stop arm extending axially and radially outwardly from said valve body.

8. The metering valve of claim 6 characterized by a second stop detent fixed to said first stop and disposed adjacent thereto, said second stop detent being engageable by a second stop provided on said drive member for limiting the rotation of said metering element in a second circumferential direction, opposite said first circumferential direction.

9. The metering valve of claim 8 characterized by said first and second stops being adjustable, said adjacent disposition of said second stop detent from said first stop, locating said second stop adjacent to said first stop when engaged with said second stop detent for convenient simultaneous access to said first and second stops for adjustment thereof.

10. The metering valve of claim 1 characterized by said metering valve being adapted for disposition within a body of fluid at supply pressure, said metering element and valve body engaging one another at contiguous surfaces thereof, at least one of said contiguous surfaces including a grooved portion accommodating said fluid at supply pressure, said accommodation enhancing the pressure equalization between the exterior of said metering valve and the interior thereof, between said contiguous surfaces for minimizing actuation torque required from said motor to rotate said metering element.

11. The metering valve of claim 10 characterized by said grooved portion being disposed in said surface of said valve body on opposite sides of said window therein.

12. The metering valve of claim 11 characterized by said grooved portion in said valve body including a pair of generally radially oriented straight grooves.

13. The metering element of claim 10 characterized by said grooved portion being disposed in said metering element and comprising a groove extending from said metering element window in a generally circumferential direction therearound.

14. The metering valve of claim 1 characterized by said valve body including a drain passage therein, said metering element including a passage therein in communication with said valve body window and said drain passage when said metering valve is closed.

15. The metering valve of claim 1 characterized by said valve body window being located at a radially interior portion of said valve body for minimizing the input torque to said metering element required to overcome reactive forces resulting from the difference in pressure across said metering element and valve body windows.

* * * * *